Aug. 9, 1932.　　　J. EHRHART　　　1,870,674
PROPELLING AND STEERING MECHANISM FOR SHIPS
Filed April 23, 1931
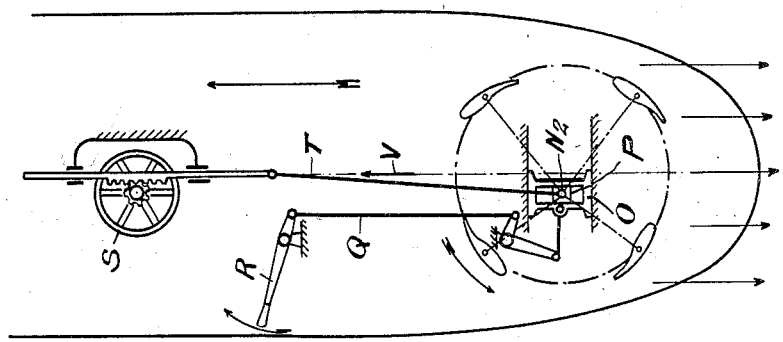
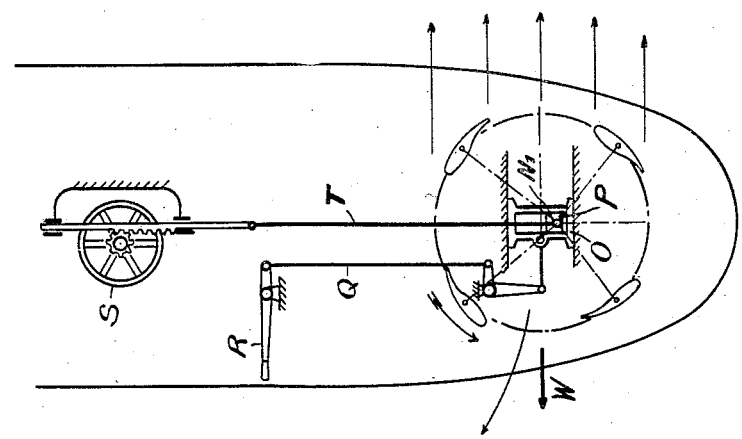
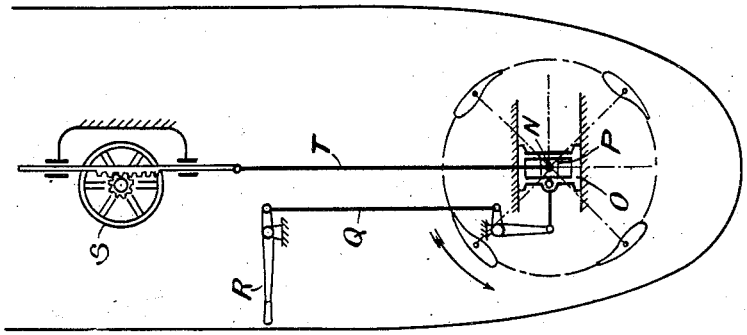
Inventor.
Josef Ehrhart
by C. P. Goepel Patented Aug. 9, 1932

1,870,674

UNITED STATES PATENT OFFICE

JOSEF EHRHART, OF ST. POELTEN, AUSTRIA, ASSIGNOR TO J. M. VOITH, OF HEIDENHEIM ON THE BRENZ, GERMANY, A COPARTNERSHIP CONSISTING OF DR. WALTHER VOITH, OF ST. POELTEN, AUSTRIA, AND DR. HERMANN VOITH AND DR. HANNS VOITH, BOTH OF HEIDENHEIM, GERMANY

PROPELLING AND STEERING MECHANISM FOR SHIPS

Application filed April 23, 1931, Serial No. 532,299, and in Germany April 26, 1930.

The foregoing invention relates to vessels furnished with propellers having the form of blade-wheels, the blades of which, during the rotation of the wheel, swing relatively to the wheel on their axes which are parallel or approximately parallel with the wheel axis, and with the action on the water either entirely or preponderatingly normal to their axes. The invention is an improvement in such propeller and has for its object to provide means for actuating and steering such propellers. In propellers of this kind, the relative movements of the blades in respect to the wheel can be changed in desired amounts and phases during operation; whereby, on the one hand, the generated thrust can be regulated to different amounts, and, on the other hand, it can be regulated in any required direction in a plane perpendicular to the axis of the wheel or disc.

The blades, according to the general law of movement pertaining thereto, are controlled either in a direct or indirect manner by a central organ, which for the sake of brevity may be referred to as a "steering-center" and which can be formed constructively in many different ways. Under mechanical regulation of the blades, this steering-center, for example, may be represented by the centre of a ring which can be displaced. In accordance with the twofold adjusting possibility of the steering centre, operative under the law of movement of the blades, the steering-center must also possess a two-dimensional adjustment or displacement. For example, it can be displaced from the zero position, where the blades have no relative movement, to different directions and for different amounts, whereby the amount of the displacement influences the amount of the thrust produced by the propeller, and whereby the direction of the displacement influences the direction of the thrust produced by the propeller.

It is furthermore well known to arrange propellers of the type just spoken of with vertical or nearly vertical axis in the ship's afterbody whereby a special effect of the two possibilities of shifting the steering-center is attained, inasmuch as the component influencing the magnitude of the power produced represents a continuous altering of the propeller thrust from "full power ahead" to "full power astern" while the other possibility of changing the direction of the thrust (i. e. the possibility of swinging the propeller jet around the vertical axis of the propeller) offers particularly advantageous steering facilities.

Conforming to the twofold transposition of the steering-center it is necessary to have two actuators in the wheel-house, each of which serves to produce the respective component and it is obvious that, to begin with, the two-dimensional transposition can be allotted to any of two components.

Following this idea it suggests itself and is actually executed to influence by means of one actuator, preferably called "pitch lever", the relative motion of the blades to the wheel only in regard to their magnitude, while the other actuator eventually called "the steering wheel" influences the phase position of the relative motion, i. e. fixes the location of the extreme positions, dead-point etc. etc. of the blades in regard to their direction to the ship's axis. This co-ordination may be particularly clearly defined by examining a specific state of operation of the propeller, for instance when the propeller is running with all blades in a peripheral position so that the ship is standing still. Starting from this state, every position of the "pitch lever" corresponds to a certain amount of thrust, and every position of the steering wheel corresponds to a certain direction of the thrust.

Therefore, the two actuating mechanisms comprising a "pitch-lever" and a "steering-wheel" can influence the generated thrust with regard to each component of a polar coordinate system.

A propeller of this kind, for instance, has been described in the U. S. A. Letters Patent No. 1,681,500.

This arrangement shows certain defects, the most important of which consists therein that at the zero position of the "pitch-lever" (for example, when the ship is floating without an exerted thrust of the propeller during landing manœuvres) an actuation of the steering-wheel will be ineffectual. Port manœuvres, furthermore, entail rather complicate operations of the pitch-lever and steering-wheel in case the ship, after a swing around its axis, has to receive an impulse ahead or astern.

Having thus characterized the status of the art as well as the results obtained in exercising it, a clear and concise description of the new invention shall be given.

The present invention eliminates these defects by the decomposition of the transposition of the steering-center into two displacements, one of which is athwart while the other one is lengthwise the ship and the linking up of these two displacements on one side with the actuating mechanism of the propeller or propellers and on the other side with the actuating means in the pilot house in such a manner that in the pilot house such a connection is arranged between the two actuating mechanisms with the propeller or propellers, that the actuation of this one order, which in this case may be called the "control-lever", always especially influences the power component in the longitudinal direction of the ship, whereas the actuation of the "steering-wheel" always especially influences the power component directed athwart the ship.

In the considered example of the operating condition of a ship which is standing still, the displacement of the control-lever alone would bring about a power or thrust in the direction "ahead" or "astern", whereas the displacement of the steering-wheel alone would create a lateral power, and the latter also during the zero position of the control-lever. With the two-dimensional displacement of the power actuating components, it is necessary in accordance with the invention that these components be projected or operated under what is called the method of Cartesian coordinates.

If one arranges, for instance, a control-center of the manner as described in the foregoing where the magnitude of its transposition from the deadpoint is a measure of the blade movement and the direction of the transposition conditionates the phase-movement, the one actuator in the wheel-house shall no more—as heretofore known—control the magnitude of transposition and the other one the direction of transposition of the control-center, but each of the two actuators shall control one of the two rectangular components of the control-center.

The nature of the general principles and objects of the invention, as above referred to, as well as other and additional objects and advantages, and the manner in which the new and novel features of construction and operation may be embodied in the idea of means, are explained in the following description and are illustrated as an example in the accompanying drawing, in which:—

Fig. 1 shows the steering-center in middle position N (dead-point) with the blades throughout in a peripheral position. Result; Ship standing still.

Fig. 2 shows the steering-center displaced in $N_1$ after having actuated steering-wheel S. Result; Ship wheeling round.

Fig. 3 shows the steering-center displaced in $N_2$ after having actuated control-lever R. Result: Ship going straight ahead.

In the illustrated examples, the steering-center is represented by slide-block P which moves lengthwise in slide O, the latter being athwart adjustable. To slide O, control-lever R is linked-up by connecting rod Q, while slide-block P is made adjustable by the steering-wheel through rod T.

The constructive details of the blade control and their connection with the propeller is irrelevant; important is but the new way of controlling the steering centre and the establishment of such a connection between wheel-house and propeller that the operation of one actuator (control-lever) predominantly controls the component in direction of the ship axis and the other one (steering wheel) permits predominantly to adjust the thrust component abreast to the former.

With the control-lever R as well as steering wheel S in their neutral position as shown in Fig. 1, even with the propeller running, the ship remains stationary.

As shown in Fig. 2, the craft retains its full steering power even in that instance, when no forward speed is applied and control-lever R, therefore, put in its neutral position (f. i. during floating). If desired, for instance, a but short turn of the steering-wheel S may shift the steering-center in the position $N_1$ by which a turning force W, resp. a tack "backboard" or "starboard" is produced. On the other hand, as shown in Fig. 3, it is possible that, by operating control-lever R alone, the steering-center may be shifted in the position $N_2$ or, for the matter of that, in any other intermediate position so that the thrust V may be brought to its max. or any other value in a continuity. With the control-lever as described afore, it is possible, if so desired, to apply a short tack "ahead" or "astern" by a short operation of the said lever R. Needless to say, both components V as well as W, acting lengthwise and athwart resp., also may be applied simultaneously by a corresponding operation of control-lever R and steering wheel S.

An especial clear steering which can easily be managed according to the sensitiveness of one's feeling results when the two working mechanisms are arranged in such a way that every movement of the mate's hand will cause a power effect coresponding in direction and dimension, respectively, to a movement of the ship; also, for example, a forward movement of the control-lever will cause a driving power of a corresponding amount, and a turn of the wheel a turning power of corresponding direction and amount.

The lateral steering of the ship becomes thereby particularly supervisory, by an arrangement of the "steering-wheel" arranged either entirely or mainly upon a vertical axis, since then the ship always seeks to follow the direction of movement of the steering-wheel, and this independently of whether the thrust is disposed ahead or astern, and independently of whether the ship, for the moment, moves ahead or astern.

Special modes of operation result from the improved arrangement when applied to ships and the like, which modes are capable of being most clearly appreciated when one compares, for instance, the control movement executed on the standard rudder wheel with horizontal axis when going astern and turning, with the corresponding movement of the steering wheel with vertical axis in the case of the newly invented control.

It will be seen that the invention disclosed is applicable to all ships having propellers of the blade-wheel type which also steer the boat, in which propellers, the blades of which during the rotation of the wheel are independently swingable around their axes and act on the water in a mainly normal or preponderatingly normal direction to the blade axes, and in which two actuating mechanisms (control-lever and steering-wheel) are arranged with such connections with one or more propellers, that by the displacement of, say, for instance, the control lever, independently of the position of the other actuator (steering-wheel) a thrust component in the direction of the ship's axis, and by the displacement of the steering-wheel, independent of the position of the other actuator (control-lever), a thrust component abreast to the former is exerted. Also, the arrangement of the actuating mechanism is such that with every displacement of an actuating mechanism a corresponding movement of the ship in proportional intensity and direction is brought about. It is also to be noted that the axis of the hand-wheel serving to steer, principally laterally, is perpendicular or inclined less than 45° from the perpendicular.

There has been shown and described herein an embodiment of the invention sought to be claimed, but it is not desired to be limited to the details thereof, since the principle of the invention as embodied in the idea of means is claimed in the claims appended hereto.

I claim:

1. In a blade-wheel propeller of the kind described, having a rotary disc with blades projecting therefrom into the medium to be operated upon, and the blades movable in respect to each other while moving around their orbit, a steering center or control point block, a guide for said block to permit it to be moved in one direction, a second guide for the first guide to permit the block to be moved in a direction at an angle to the first direction, the movement of one guide being independent of the other guide, means for moving the block from zero position in either direction, and means translating the movement of the block to the blades.

2. In a blade-wheel propeller of the kind described, having a rotary disc with blades projecting therefrom into the medium to be operated upon, and the blades movable in respect to each other while moving around their orbit, means moving a control point in one of two, or in two angular directions, from zero to full extent, each independently of the other and means translating said movement or movements of the control point to the blades to position the blades in correspondence to the amount of thrust and direction of thrust desired in correspondence with the movement of the control point.

3. In a blade-wheel propeller of the kind described, having a rotary disc with blades projecting therefrom into the medium to be operated upon, and the blades movable in respect to each other while moving around their orbit, means actuating the blades to give a lateral thrust and coextensive movement to the ship, in one direction, and means actuating the blades to give a forward or rearward thrust, said actuating means being independently movable of each other from zero position.

4. Propelling and a steering mechanism for ships driven by blade-wheel propellers, the blades of which, during one revolution of the wheel and relative to the latter, swing around axes which are parallel or nearly parallel to the axis of rotation of the propeller and are always fully immersed in water, with the action predominantly normal to the blade axis; a control point mechanism, a control-lever, a steering-wheel, means connecting the propeller blades with the control point mechanism, and separate means connecting the control mechanism with the control lever and steering wheel, each operative from the zero position of the control mechanism independently of the other.

5. Propelling and a steering mechanism for ships driven by blade-wheel propellers, the blades of which, during one revolution of the wheel and relative to the latter, swing around axes which are parallel or nearly parallel to the axis of rotation of the propeller and are always fully immersed in water, with the action predominantly normal to the blade axis; a control point mechanism, a control-lever, a steering-wheel, means connecting the control lever with the control point mechanism, independently of the position of the steering-wheel, to exert a thrust component in the direction of the ship's axis upon the control point mechanism, and means connecting the control point mechanism with the steering wheel independently of the position of the control-lever, to exert a thrust component abreast to the former upon the control point mechanism, whereby a movement of either control-lever or steering wheel in any direction imparts to the ship a movement in the same direction.

6. Propelling and steering mechanism, as per claim 5, the axis of the steering wheel for lateral movement of the ship being perpendicular or inclined less than 45° from the perpendicular.

7. In propelling and steering mechanism for ships, a blade wheel, the blades of which move with the wheel in a circular path while having independent swinging movement on their own axes to vary their propulsive thrust on the water and thereby control the course of the vessel (whether forwardly, backwardly, or laterally); means independent of the rotation of the wheel for swinging the blades, comprising a common control point connected with the blades and positionable to coincide with the axis line of the wheel for movement radially of the wheel within the circular path described by the blades, and means connected with the control point by which to cause movement of the control point from zero position along a straight line secant to the circular path described by the blades, said last-mentioned means functioning to cause movement of the control point along any such straight secant line from and to any radial position which the control point may occupy between the axis line of the wheel and the compass of the circular path described by the blades.

8. Propelling and steering mechanism for ships, consisting of a blade wheel, the blades of which have axes substantially parallel with the wheel axis and which swing on their axes independently and relatively as they move in the circle of their movement with the wheel; a control point on intersecting lines extending from the blades, with which the blades are connected for individual actuation, said control point being independently translatory with respect to the wheel and within the circle described by the blades in their course with the wheel; guides for the control point, means for moving one guide, to displace with each movement thereof the control point, and means for moving the other guide, to displace with each movement thereof the control point, each means moving said point on any straight line secant to the circle described by the blades in their movement with the wheel, said moving means adapted to be operated either independently of or concurrently with each other, and whereby any movement of one moving means displaces the control point.

9. In propelling and steering mechanism for ships, a blade wheel, the blades of which have axes substantially parallel with the wheel axis and which swing on their axes independently and relatively as they move in the circle of their movement with the wheel; a control point on intersecting lines extending from the blades, with which the blades are connected for individual actuation, said control point being independently translatory with respect to the wheel within the circle described by the blades in their course with the wheel; movable guide means commanding the translatory movement of the control point; lever and rudder devices each connected with the guide means independently of the other for moving the guide means independently, the connections of each of said devices providing for the movement of the guide means in a substantially straight course of movement, with the straight course of movement of the guide means accomplished by one of said devices being at an angle to the straight course of movement of the guide means accomplished by the other of the devices.

10. In propellers of the blade wheel type, the blades of which, while moving in an orbit, swing around their axes with an independently variable amplitude and phase movement thereby controlling the course of the vessel (whether forwardly, backwardly, or in wheeling the vessel about); means for controlling the amplitude and phase of the swinging blades, comprising means for displacing the real or imaginary steering centre from zero position in a direction predominantly perpendicular to the ship's axis, and means independent of the former for displacing the real or imaginary steering centre from zero position in either direction along a line parallel to the ship's axis and within the orbit of the blades.

11. In propellers of the blade wheel type, the blades of which have axes substantially parallel with the wheel axis and which, while revolving in an orbit, swing around their axes; a control mechanism, having a real or imaginary center on intersecting lines extending from the blades, with which mechanism the blades are connected for individual actuation, said centre to be independently displaceable with respect to the ship's axis and substantially perpendicular to it; supervisory means for the control mechanism, means for displacing these supervisory means, to displace with each movement thereof the real or imaginary steering center, each means moving said center along a course predominantly perpendicular to the other, said moving means adapted to be operated not only independently of but concurrently with each other, and whereby any movement of one moving means displaces the steering centre in its coordinate direction and consequently causing the blades to impart to the ship a movement in the same sense as the operation by the mate in the pilot house were executed.

12. In propellers of the blade wheel type, the blades of which have axes substantially parallel with the wheel axis and which, while revolving in an orbit, swing around their axes; a control mechanism, having a real or imaginary centre on intersecting lines extendin from and coordinated to the blades, with which the blades are connected for individual actuation, said centre to be independently displaceable one way substantially parallel to the ship's axis and the other way substantially perpendicular thereto; two movable supervisory means commanding the translatory displacement of the real or imaginary steering centre; lever and rudder devices each connected to one of the supervisory means independently of the other for moving the supervisory means independently, the connection of each said devices providing for the displacement of the supervisory means in a substantially straight course of movement, with the course of movement of the supervisory means accomplished by one of said devices being at a substantially right angle to the course of movement of the supervisory means accomplished by the other of the devices.

13. In propellers of the blade wheel type, the blades of which, during one revolution of the wheel and relative to the latter, swing around axes which are parallel or nearly parallel to the axis of rotation of the propeller and are always fully immersed in water, with the action predominantly normal to the blade axis; a control mechanism for the steering centre, permitting a displacement of the steering centre lengthwise and athwart the ship, a control-lever, a steering-wheel, both in the wheelhouse, means connecting the propeller blades with the control mechanism of the steering centre, and separate means connecting the control mechanism of the steering centre with the control-lever and steering-wheel, each operative from the zero position of the control mechanism independently of the other, so as to cause the blades to impart to the ship a movement, the direction and intensity of which follows the same sense and is in proportion to the operation executed by the mate in the wheel-house.

14. In propellers of the blade wheel type, the blades of which, during one revolution of the wheel and relative to the latter, swing around axes which are parallel or nearly parallel to the axis of rotation of the propellers and are fully immersed in water, with the action predominantly normal to the blade axis; a control mechanism for the steering centre, permitting a displacement of the steering centre lengthwise and athwart the ship, a control-lever, a steering-wheel, both in the wheelhouse, means connecting the control lever with the control mechanism independently of the position of the steering-wheel, to exert a thrust component in the direction of the ship's axis, and means connecting the control mechanism with the steering-wheel independently of the position of the control-lever, to exert a thrust component abreast to the former, whereby a movement of either control-lever or steering wheel in any direction imparts to the ship a movement in the same sense.

15. Propelling and steering mechanism as per claim 14, the axis of the steering wheel for wheeling the ship about being perpendicular or inclined less than 45° from the perpendicular.

In testimony whereof I affix my signature.

JOSEF EHRHART.